United States Patent
Ito

(10) Patent No.: US 12,114,686 B2
(45) Date of Patent: Oct. 15, 2024

(54) GLASS NOODLE WITH LOW STABILIZED PEA STARCH

(71) Applicant: ROQUETTE FRERES, Lestrem (FR)

(72) Inventor: Goichi Ito, Tokyo (JP)

(73) Assignee: Roquette Freres, Lestrem (FR)

( * ) Notice: Subject to any disclaimer, the term of this patent is extended or adjusted under 35 U.S.C. 154(b) by 675 days.

(21) Appl. No.: 16/651,754

(22) PCT Filed: Oct. 1, 2018

(86) PCT No.: PCT/EP2018/076698
§ 371 (c)(1),
(2) Date: Mar. 27, 2020

(87) PCT Pub. No.: WO2019/068663
PCT Pub. Date: Apr. 11, 2019

(65) Prior Publication Data
US 2020/0245653 A1    Aug. 6, 2020

(30) Foreign Application Priority Data

Oct. 3, 2017    (EP) .................................... 17306321

(51) Int. Cl.
A23L 7/109    (2016.01)
A23L 29/219    (2016.01)
A23P 30/20    (2016.01)

(52) U.S. Cl.
CPC ............. *A23L 7/109* (2016.08); *A23L 29/219* (2016.08); *A23P 30/20* (2016.08)

(58) Field of Classification Search
CPC ......... A23L 7/109; A23L 29/219; A23P 30/20
See application file for complete search history.

(56) References Cited

U.S. PATENT DOCUMENTS 6,589,585 B1    7/2003    Klingler et al.

FOREIGN PATENT DOCUMENTS

| CN | 106578914 A | 4/2017 |
| JP | S615723 A | 1/1986 |
| JP | 2007289089 A | 11/2007 |
| JP | 5431607 B1 | 3/2014 |
| JP | H05316978 A | 3/2014 |

OTHER PUBLICATIONS

English abstract of JP 59125858 Nasu Jul. 20, 1984 (Year: 1984).*
The English translation of the International Search Report, mailed on Dec. 4, 2018, in the corresponding PCT Appl. No. PCT/EP2018/076698.
Northern Pulse Growers Association: "Food Applications of Pea Starch", Northern Crops Institute Jun. 28, 2013 (Jun. 28, 2013), XP002776567, Retrieved from the Internet: URL:http://www.northernpulse.com/uploads%5 Cresources%5C908%5C2013-food-applicationsof-pea-starch-npga-%282%29.pdf.
(Continued)

*Primary Examiner* — Katherine D Leblanc

(57) ABSTRACT

The present invention is relative to an extruded oriental noodle, consisting essentially of a starch and water, characterized in that the starch used in the preparation of the noodle is low stabilized pea starch.

11 Claims, 4 Drawing Sheets

(56) References Cited

OTHER PUBLICATIONS

Wang Ning et al: "Physicochemical properties of starches from various pea and lentil varieties, and characteristics of their noodles prepared by high temperature extrusion", Food Research International, Elsevier, Amsterdam, NL, vol. 55, Nov. 4, 2013 (Nov. 4, 2013), pp. 119-127, XP028669416.

Ning Wang et al: "Pea starch noodles: Effect of processing variables on characteristics and optimisation of twin-screw extrusion process", Food Chemistry, Elsevier Ltd, NL, vol. 133, No. 3, Jan. 26, 2012 (Jan. 26, 2012), pp. 742-753, XP028468300.

Kasemsuwan et al., "Preparation of clear noodles with mixtures of tapioca and high-amylose starches," Carbohydrate Polymers 32 (1998), pp. 301-312.

Niu et al., "Effects of Inorganic Phosphates on the Thermodynamic, Pasting, and Asian Noodle-Making Properties of Whole Wheat Flour," Cereal Chemistry 91(1):1-7—Jan. 2014.

Alberto Enrique Herrera Márquez, "Evaluation of the influence of the degree of acetylation of arracacha starch (Arracacia xanthorriza) on some of its physicochemical properties," National university of Colombia, published in 2014. (English abstract included).

C.-Y. Lii and S.-M. Chang entitled "Characterization of Red Bean (*Phaseolus radiatus* var. Aurea) Starch and Its Noodle Quality", J. Food Science 46, p. 79 (1981).

Database WPI, Week 201418, Thomson Scientific, London, GB; an 2014-D86967, XP002776568, Mar. 5, 2014.

Canadian Grain Commission, "New process to make high-quality starch noodles with Canadian peas developed," retrieved from the Internet: https://www.grainscanada.gc.ca/fact-fait/peas-pois-eng.htm, May 10, 2017.

1 Huang Junrong, "Structure and Properties of Acetylated Bean Starch," Jiangnan University, 2007.

\* cited by examiner

GLASS NOODLE WITH LOW STABILIZED PEA STARCH

CROSS-REFERENCE TO RELATED APPLICATIONS

This application is a National Stage Application of PCT/EP2018/076698 filed Oct. 1, 2018, which claims priority from European Patent Application No. 17306321.5, filed on Oct. 3, 2017. The priority of said PCT and European Patent Application are claimed. Each of the prior mentioned applications is hereby incorporated by reference herein in its entirety.

The present invention provides an oriental noodle consisting essentially of starch and water, wherein the mung bean starch traditionally present in the noodles is replaced by low stabilized pea starch.

The present invention relates also to their related process of preparation.

STATE OF THE ART

Starch noodles are an important part of Asian cooking and diet.

Commonly called cellophane or glass noodles, they are known for their glassy, translucent appearance and are used in soups, stir-fries and rolls.

The qualities that customers look for these in starch noodles are a bland taste and short cooking time.

Consumers also prefer noodles that stay firm and unsticky when cooked.

The traditional choice for making high-quality starch noodles is mung beans, a bean that is native to South Asia, but also grown in places like Australia and India.

The mung bean starch provides unique properties and is the ideal material for noodle manufacture, for example for maintaining the translucency of the glass noodles both before and after cooking.

However, if starch noodles made from mung beans provide all these qualities, mung bean starch is an expensive choice, as world production of mung beans is limited.

So attempts have been made to replace it with other starches with frequently the necessity to adapt/optimize the process of preparation.

To replace mung bean starch, manufacturers want a more economical choice that can provide the same high quality starch noodles.

One such attempt is reported in an article by C.-Y. Lii and S.-M. Chang entitled "Characterization of Red Bean (*Phaseolus radiatus* var. *Aurea*) Starch and Its Noodle Quality", J. Food Science 46, p. 79 (1981).

It involved the use of red bean starch and more precisely an equal mixture of red bean starch and mung bean starch.

Organoleptic evaluation indicated that the noodles made from the mung bean-red bean starch mixture were similar in texture to the mung bean noodles, but the red bean starch noodles were slightly softer.

Other attempts to replace mung bean starch have included the use of canna, sweet potato, and cassava starches, which have amylose contents of about 27, 26.5, and 22.5% respectively, knowing that mung bean starch has an amylose content of about 33%.

However, noodles prepared from these tuber starches were technologically inferior; they were too soft and their solid losses during cooking were much higher.

Another attempt describes the use of standard potato starch and pea starch, but the texture and the color are not satisfactory.

See for example the document published by the Northern Pulse growers Association (http://www.northernpulse.com/uploads%5Cresources%5C908%5C2013-food-applications-of-pea-starch-npga-(2).pdf) that shows that potato and pea starches provide less firmer texture, slightly shorter cooking time and slightly higher cook loss than those made with mung bean starches, even if pea starch is presented as a good candidate to substitute mung bean starch.

Last, as it seems not possible to totally replace mung bean starch, it was proposed to blend mung bean starch with other starches, like potato starch or pea starch, in order a minima to cut down the cost.

However, it was to the detriment of texture (strong texture . . . ) and color (dark, dull . . . ) after cooking.

An alternative with more economical starches such as pea starch to make starch noodles with acceptable texture was based on the development of a new process of manufacturing noodles.

Traditionally, mung bean starch noodles are made using a cylinder-type extrusion process.

The process involves taking mung bean starch and mixing a small portion, such as 5%, with water and cooking it until it gelatinizes.

This gelatinized portion is then added back to the remaining starch and more water is mixed in. Adding this gelatinized portion allows the mixture to form a paste-like consistency that can be put into a cylinder, compressed and extruded through a die to make noodles. The noodles are then cooked in boiling water, cooled in tap water and air-dried.

The new process recommended with pea starch (see https://www.grainscanada.gc.ca/fact-fait/peas-pois-eng.htm) uses high-temperature twin-screw extrusion, a process that is not traditionally used to make noodles, but is commonly used by manufacturers to make cereals, snack foods and soy-based meat alternatives.

However, manufacturers do not all wish to adopt a new method and use new equipment, even if high-temperature twin-screw extrusion could prove a simpler and potentially more economical option for making starch noodles.

They expect new starch, which can replace mung bean starch completely, without changing the process.

To remedy to all the encountered difficulties, the solution that is proposed by the present invention is to substitute mung bean starch with a modified pea starch, particularly a low stabilized pea starch and more particularly a low acetylated pea starch.

SUMMARY OF THE INVENTION

The invention relates to an extruded oriental noodle, consisting essentially of a starch and water, characterized in that the starch used in the preparation of the noodle is low stabilized pea starch.

"Essentially" means more than 99%.

The low stabilized pea starch is a low acetylated pea starch with an acetyl value below 2%, between 0.25 and 1%, more preferably between 0.55 and 1%

The noodle so obtained is characterized in that its component low acetylated pea starch shows a gelatinized temperature compared to that of native pea starch decreased from 0.4 to 5.0° C., more preferably from 4.0 to 5.0° C. (i.e between 0.4 and 5° C., more preferably between 4.0 and 5.0° C. lower).

DETAILED DESCRIPTION OF THE INVENTION

Figure 1:
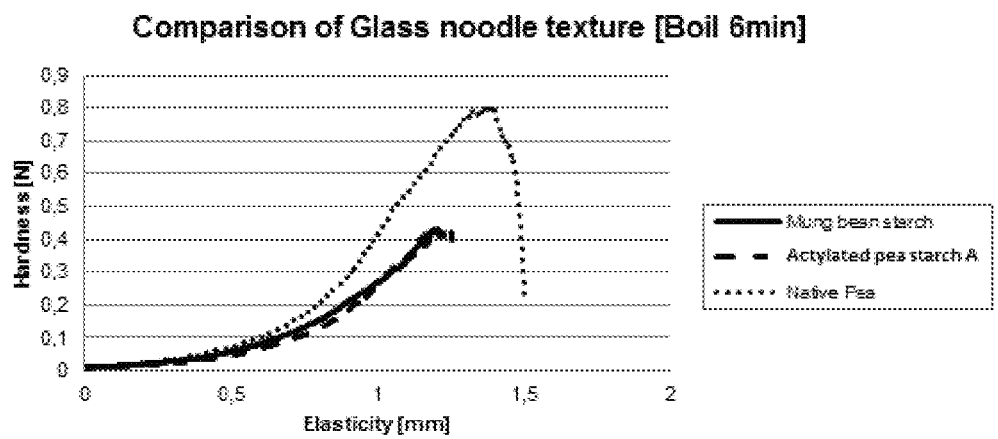
FIG. 1 shows a comparison of Glass noodle texture.

Glass noodle is an "Asian starch based noodle" that is traditionally made with 100% mung bean starch.

As development of food culture, glass noodles manufacturers may change partially the ingredient to pea starch or potato starch, in order to cut down the cost.

They propose "Low price" or "Normal" types glass noodles made with mix of pea starch and mung bean starch besides the Premium Type that contains only mung bean starch.

However, the Applicant has noted that the quality obtained with either the Low Price or the Normal types is far away from that of Premium type.

The following table reflects the texture and cooking resistance obtained.

|  | Low Price type | Normal type | Premium type |
| --- | --- | --- | --- |
| Ingredients | Pea starch Mung bean starch | Pea starch Mung bean starch | Mung bean starch |
| Color Product Cooked | White Dark and dull | White Little dull | White Clear and white |
| Texture | Sticky | strong | Low sticky |
| Water uptake |  | Equivalent |  |
| Diameter change | Increase to 145% | Increase to 162% | Increase to 200% |
| Cooking resistance | + | ++ | +++ |

Thus it is observed that for example on diameter change of noodle string, if all the glass noodles increased their diameter by water uptake, the increasing ratio depends on noodle ingredients.

More particularly, the Premium type shows significantly increased ratio of diameters.

The Low Price type shows soft texture, earlier than others in boiling water, and doesn't have over cooking resistance enough, compared with Normal and Premium types.

The Normal type presents also less over cooking resistance compared with Premium type.

Thus, the glass noodle with pea starch mixed with mung bean starch shows not acceptable textures.

In order to propose new starch that can advantageously and economically replace totally mung bean starch, the Applicant carried on numerous experiments to test modified starches, and more particularly modified pea starches.

Starch modification is a classical way to alter the structure of starch, and usually exert a major change on a desirable physical property.

Nevertheless, even low levels of modification are able to dramatically alter the physical properties of starch, such as paste viscosity, gelling, syneresis, clarity, adhesion and emulsifying properties. Cross-linked starches offer acid, heat and shear stability over their parent native starches.

Stabilization of starch is for example aimed at preventing retrogradation by introducing substituent groups. The interactions of glucan chains in the starch granule are weakened by the introduction of the substituents and, consequently, hydration and gelatinization of starch by cooking is achievable at lower temperatures.

The effectiveness of stabilization depends upon the number and nature of the substituted group.

Acetylation and hydroxypropylation are the primary food-approved types of stabilization, and those with a degree of substitution (DS) below 0.2 are of commercial importance.

Among a great variety of starch esters, starch acetate is the one that is actively marketed. The maximum level of 2.5% acetyl for food use corresponds to a DS value of 0.1.

The steric disturbance of the acetyl group will make starch solubilization easier by lowering the energy level of the network created by the hydrogen bonds, and will slow down the retrogradation.

The starch-starch interactions in the granule are weakened by the introduction of acetyl groups and, consequently, hydration and gelatinization by cooking is achievable at lower temperatures.

Such starches benefit from easy cooking and are particularly useful in low moisture environments and in applications where the moisture level is restricted by competition from co-ingredients, e.g. in extruded and coated snacks, frozen fish and cooked meat products, flour based noodles, bakery products and in various frozen or cold stored ready-to-eat menus.

The acetyl group also generates a hydrophobic type of structure suitable for certain applications, including acid pH-resistant binders in the food industry, and adhesive and greave resistance in paper sizing.

Starch acetates are readily prepared by reacting the starch with acetic anhydride in the presence of diluted sodium hydroxide. Alternatively, vinyl acetate can be used for acetylation in aqueous suspension in the presence of sodium carbonate as catalyst.

In the present invention, the applicant has decided to test various acetylation level of starch to try to substitute efficiently mung bean starch.

The applicant has found that to do so, there are two important parameters to take into account:
The content of amylose of this particular starch;
Its gelatinized temperature.

On the first point, as mung bean starch contains 30 to 35% of amylose, the pea starch with its 35% of amylose content is the best choice.

On the second point, as the gelatinized temperature of mung bean starch is lower than the one of pea starch, the applicant decided to choose a particular modified pea starch, and more particularly an acetylated modified pea starch.

All the difficulties are indeed based on the choice of the appropriate level of modification, able to satisfy this condition.

The Applicant found also that the level of modification has to decrease the gelatinized temperature of pea starch, and notably found that its value has to be advantageously decreased from 0.4 to 5.0° C., more preferably from 4.0 to 5.0° C.

To determine this parameter, three acetylated pea starch were tested:

Acetylated pea starch "A": a pea low acetylated pea starch, produced classically (starch slurry with acetic anhydride in the presence of diluted sodium hydroxide) so that its acetyl value is between 0.55% and 1%. Its gelatinized temperature is 68.9° C.;

Acetylated pea starch "B": a pea low acetylated pea starch, produced classically (starch slurry with acetic anhydride in the presence of diluted sodium hydroxide) so that its acetyl value is between 0.25% and 0.5%. Its gelatinized temperature is 72.95° C.;

Acetylated pea starch "C": a pea low acetylated pea starch, produced classically (starch slurry with acetic anhydride in the presence of diluted sodium hydroxide) so that its acetyl value is between 1.7% and 1.8%. Its gelatinized temperature is 66.9° C.;

As a comparison, the gelatinized temperature of native pea starch is around 73.4° C. and the gelatinized temperature of mung bean pea starch is around 66.95° C. (values determined by analysis of the standard RVA profiles of these respective starches).

EXAMPLES

This invention will be better understood in light of the following examples which are given for illustrative purposes only and do not intend to limit the scope of the invention, which is defined by the attached claims.

Example 1

Recipe:

|  |  | Mung bean starch | acetylated pea starch "A" | Native Pea |
|---|---|---|---|---|
| Phase A | Mung bean starch | 10 |  |  |
|  | Acetylated pea starch "A" |  | 10 |  |
|  | Native pea starch |  |  | 10 |
|  | Water | 15 | 15 | 15 |
| Phase B | Boiling water | 140 | 140 | 140 |
| Phase C | Cold water | 30 | 60 | 60 |
|  | Mung bean starch | 200 |  |  |
|  | Acetylated pea starch "A" |  | 200 |  |
|  | Native pea starch |  |  | 200 |
| Total |  | 395 | 425 | 425 |

*Water volume was determined, to adjust the dough hardness of these recipes.

Method of Manufacturing Glass Noodle Without Freeze:
  Make starch slurry by mix Phase A starch with water,
  Add boiling water (140 ml, Phase B) and mix 5 min with hand-mixer (820 rpm),
  Add phase C to starch slurry, and mix at 61 rpm for 1 min, then mix at 113 rpm for 10 min,
  Pump the dough and extrude through a 2.5 mm nozzle diameter, and boil 10 sec,
  Cool in icy cold water for 5 min,
  Air dry at 80° C. for 1 hours.
Cooking and Texture Analysis
  boil the noodle in a cup with 500 ml boiling water,
  wait for 2 min,
  store the noodle in the fridge at 4° C., and check the noodle texture at 1 day, 4 days, 8 days, 12 days and 16 days by using a Texture Analyzer SHIMADZU EZ-SX following the operative guidelines of the manufacturer with the following conditions:
  Time: 1
  Plunger: tooth shape chip
  Speed: 3 mm/min
  Sample size: 1 string
Results:
Noodle Texture: Hardness and Softness (See FIG. 1).

The noodle textures were compared in same cooking time, 6 min.

Figure 2:
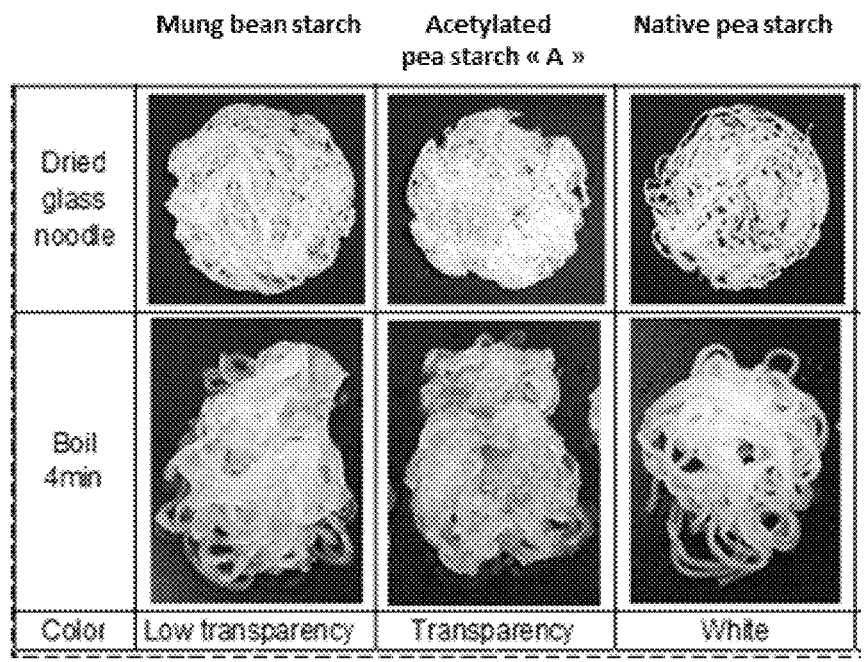
FIG. 2 shows the difference of noodle colour.

As a result, glass noodle with Acetylated pea starch "A" shows similar texture than that of Mung bean starch, and native pea starch shows harder and stronger texture than Mung bean starch.
Noodle Color:

The difference of noodle colour is shown in FIG. 2.

As a result, native pea starch shows white color, completely different from that of Mung bean starch. This is one of the weakness of native pea starch.

In the contrary, Acetylated pea starch "A" shows transparency color.

It indicates the stabilization by low acetylation will correct one of the weakness of native pea starch on Glass noodle application.

Example 2

In this example, we compare the performance of Acetylated pea starch "A" versus mung bean starch.
Recipe

|  |  | Mung bean starch | Pea | Acetylated pea starch "A" |
|---|---|---|---|---|
| Phase A | Mung bean starch | 10 |  |  |
|  | Native pea starch |  | 10 | 10 |
|  | Water | 15 | 15 | 15 |
| Phase B | Boiling water | 140 | 140 | 140 |
| Phase C | Cold water | 30 | 60 | 60 |
|  | Mung bean starch | 200 |  |  |
|  | Native pea starch |  | 200 |  |
|  | Acetylated pea starch "A" |  |  | 200 |
| Total |  | 395 | 425 | 425 |

Method of Manufacturing Glass Noodle with Freeze Step:
  Make starch slurry by mix Phase A starch with water,
  Add boiling water (140 ml, Phase B) and mix 5 min with hand-mixer (820 rpm),
  Add phase C to starch slurry, and mix at 61 rpm for 1 min, then mix at 113 rpm for 10 min,
  Pump the dough and extrude through a 2.5 mm nozzle diameter, and boil 30 sec,
  Cool in icy cold water for 10 min,
  Rinse in water and freeze it at −20° C. for 1 day,
  Thaw a frozen glass noodle by water flow for 30 min,
  Put Into a mold,
  Then air dry at 80° C. for 1 hour.
Cooking and Texture Analysis
  Put glass noodle in a cup and poor 500 ml boiling water,
  Wait for 3 min,
  Measure the texture by using a Texture Analyzer SHIMADZU EZ-SX following the operative guidelines of the manufacturer with the following conditions:

Time: 1
Plunger: tooth shape chip
Speed: 3 mm/min
Sample size: 1 string

Figure 3:
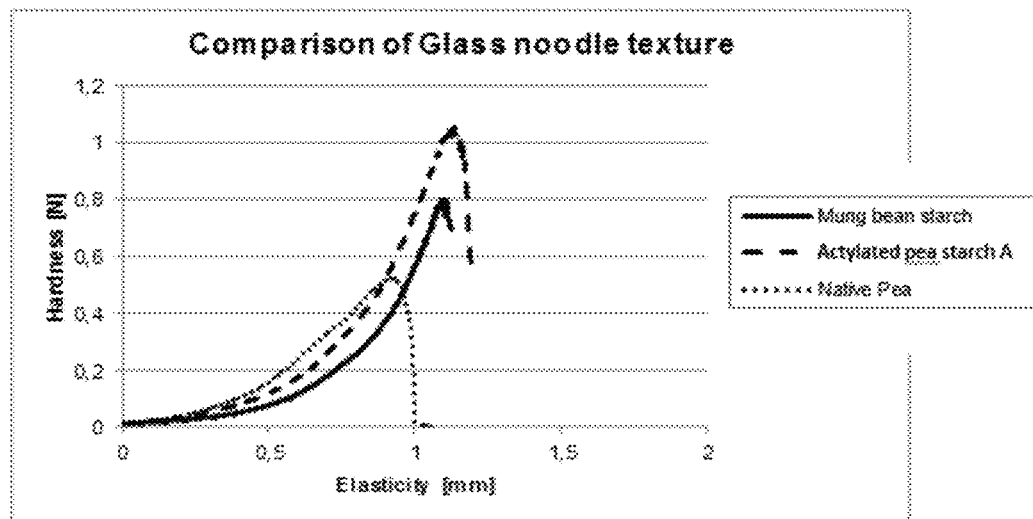
FIG. 3 shows the effect of modification in terms of instant glass noodle texture.

Result:

Effect of Modification in Terms of Instant Glass Noodle Texture (Cf. FIG. 3)

To confirm that the acetylated pea starch may be advantageously used to prepare traditional glass noodle manufacturing, it was evaluated by using the method described above.

Acetylated pea starch "A" alters glass noodle texture elasticity, meaning that Acetylated pea starch confers an elastic texture equivalent to that of mung bean starch containing noodle.

Example 3

Evaluation of Different Levels of Acetylation for the Manufacturing of Instant Mass Noodle with Freeze Step As the noodle with Acetylated pea starch "A" shows good results but a little bit softer texture than the one with Mung bean starch (in Non-freeze glass noodle application), this example aim at testing the use of other levels of acetylation, to better define the range of acceptable acetylation.

Recipe

|  |  | Mung bean | Native Pea starch | Acetylated pea starch "B" | Acetylated pea starch "A" | Acetylated pea starch "C" |
|---|---|---|---|---|---|---|
| Phase A | Mung bean starch | 10 |  |  |  |  |
|  | Native pea starch |  | 10 |  |  |  |
|  | Acetylated pea starch "B" |  |  | 10 |  |  |
|  | Acetylated pea starch "A" |  |  |  | 10 |  |
|  | Acetylated pea starch "C" |  |  |  |  | 10 |
|  | Water | 15 | 15 | 15 | 15 | 15 |
| Phase B | Boiling water | 140 | 140 | 140 | 140 | 140 |
| Phase C | Cold water | 30 | 60 | 60 | 60 | 60 |
|  | Mung bean starch | 200 |  |  |  |  |
|  | Native pea starch |  | 200 |  |  |  |
|  | Acetylated pea starch "B" |  |  | 200 |  |  |
|  | Acetylated pea starch "A" |  |  |  | 200 |  |
|  | Acetylated pea starch "C" |  |  |  |  | 200 |
| Total |  | 395 | 425 | 425 | 425 | 425 |

*Water volume was determined, to adjust the dough hardness of these recipes.

Method of Manufacturing Glass Noodle with Freeze Step:
Make starch slurry by mix Phase A starch with water,
Add boiling water (140 ml, Phase B) and mix 5 min with hand-mixer (820 rpm),
Add phase C to starch slurry, and mix at 61 rpm for 1 min, then mix at 113 rpm for 10 min,
Pump the dough and extrude through a 2.5 mm nozzle diameter, and boil 30 sec,
Cool in icy cold water for 10 min,
Rinse in water and freeze it at −20° C. for 1 day
Thaw a frozen glass noodle by water flow for 30 min
Put Into a mold,
Then air dry at 80° C. for 1 hour.

Cooking and Texture Analysis
boil the noodle in a cup with 500 ml boiling water,
wait for a few min (depending on the studies),
measure the texture by using a Texture Analyzer SHIMADZU EZ-SX following the operative guidelines of the manufacturer with the following conditions:
Time: 1
Plunger: tooth shape chip
Speed: 3 mm/min
Sample size: 1 string Cooking and Water Uptake
Measure the weight of dried glass noodle,
Put the noodle in a cup, and poor 500 ml of boiled water,
Wait 3 min,
Take off the water,
Measure the weight of cooked glass noodle.

Cooking and Water Content
Measure the weight of dried glass noodle,
Put the noodle in a cup, and poor 500 ml of boiled water,
Wait a few min,
Measure the water content of cooked glass noodle, by using loss on drying at 115° C. during 3 h under vacuum.

Figure 4:
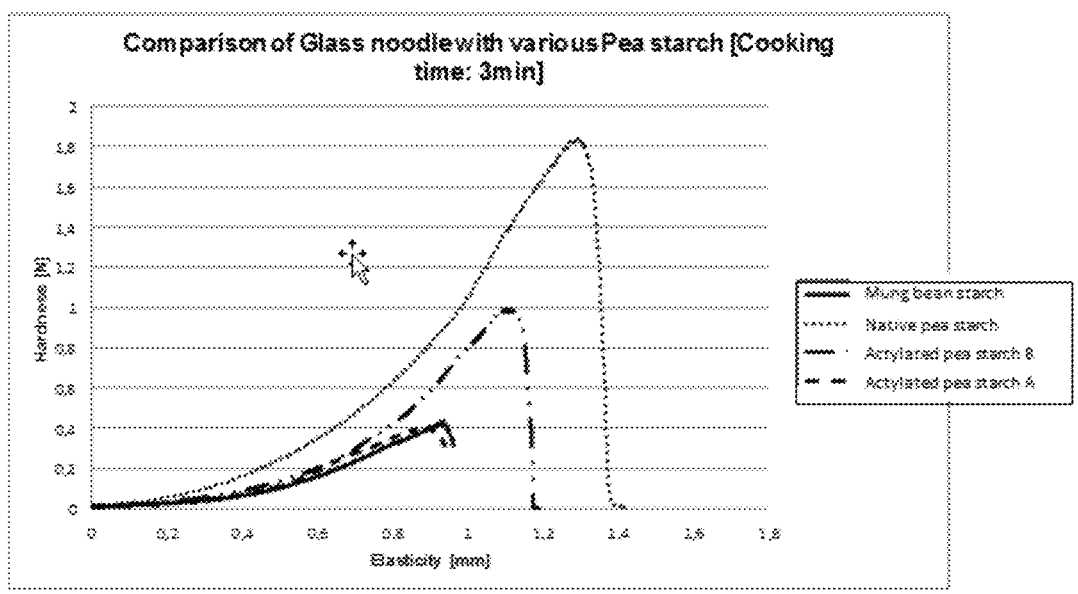
FIG. 4 shows a comparison of Glass noodle with various pea starch.

Result:

Glass Noodle Texture, Aptitude and Color (Cf. FIG. 4).

Instant glass noodle textures were compared, to identify the difference of various level of acetylation of pea starch.

Acetylated pea starch "A" shows similar texture to Mung bean starch.

Native Pea starch and Acetylated pea starch "B" show harder texture than Mung bean starch. On the other hand, Acetylated pea starch "C" is too sticky to make glass noodle, and couldn't form noodle shape (so values not plot in FIG. 4).

Figure 5:
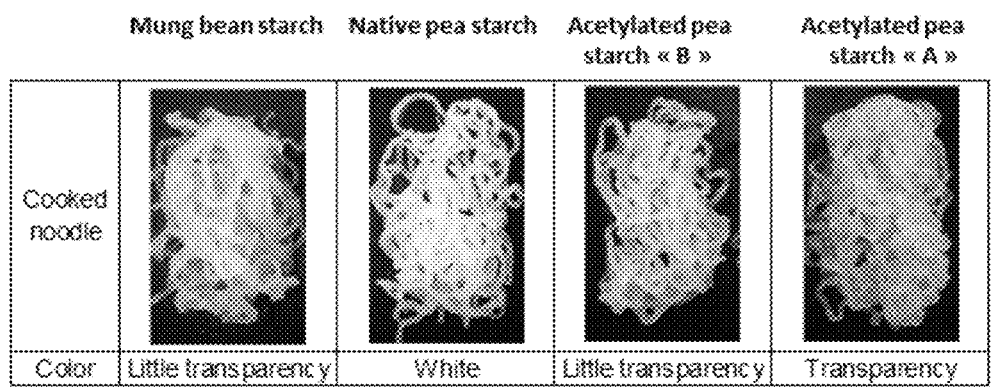
FIG. 5 shows a comparison of the color of instant glass noodles.

The color of instant glass noodle was also compared (cf. FIG. 5).

The instant glass noodles, made with Native Pea starch, are white color, that is their main weakness. It has been verified that Acetylated pea starch "A" enable to overcome such weak point.

Acetylated pea starch "B" is less performant but acceptable.

Water Uptake Property

In order to evaluate aptitude of each starches in instant glass noodle, "water uptake property" and "manufacturing aptitude" were compared.

It was confirmed that the water uptake ratio of the noodles with Acetylated pea starch "A" and of the noodles with the Acetylated pea starch "B" are equivalent to the one of noodles with Mung bean starch, i.e around 400-450%.

Native pea starch shows hard texture and low water uptake ratio, less than 400%.

As a conclusion, Acetylated pea starch "B" is acceptable, and Acetylated pea starch "A" remains the best candidate to replace mung bean starch.

|  | Manufacturing aptitude | | | Water uptake [Cooking time: 3 min] | | |
|---|---|---|---|---|---|---|
|  | Tensile strength | Adhesiveness | Aptitude | Before cook | After cook | Ratio |
| Mung bean | Strong | Less | + | 4.06 | 17.75 | 437% |
| Pea | Strong | Less | + | 3.40 | 10.03 | 295% |
| B | Strong | Less | + | 3.29 | 12.67 | 385% |
| A | Strong | Less | + | 3.74 | 17.39 | 465% |
| C | Quite Weak | Sticky | − | N/A | N/A | N/A |

Cooking Resistance

In order to compare Mung bean starch and acetylated pea starch, we have compared their cooking resistance,—(hardness and water uptake).

Figure 6:
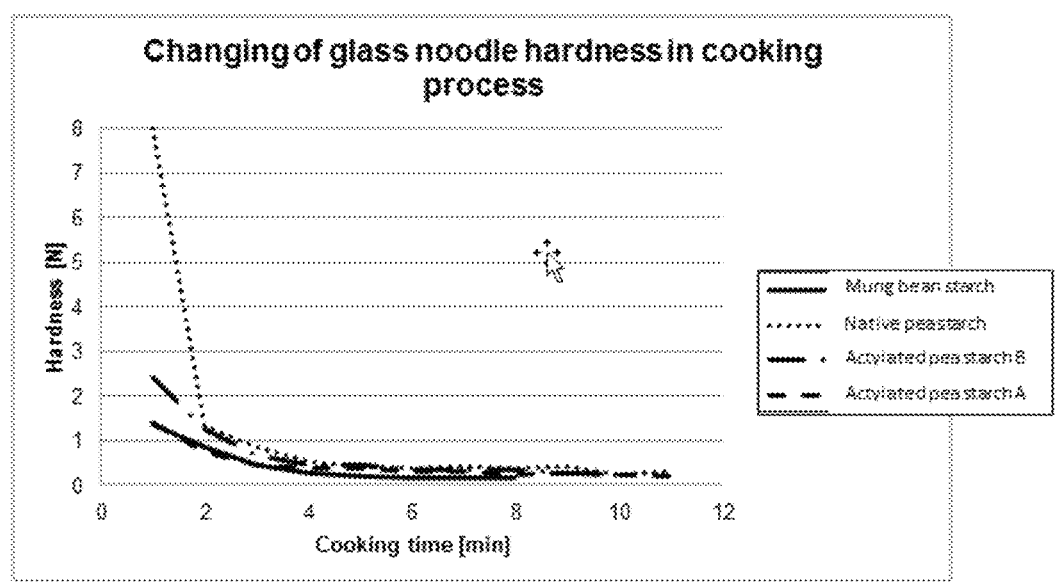
FIG. 6 shows the changing of glass noodle hardness in cooking process.

Hardness (cf. FIG. 6)

Noodles with Acetylated pea starch "A" and noodles with Mung bean starch show similar cooking resistance in terms of hardness. Noodles with Acetylated pea starch "B" are little bit different compared to noodles with Mung bean starch, but the texture changing is similar to the one of noodles with Mung bean starch, and it is acceptable. Noodles with Native pea starch show completely different texture compared to the one of Mung bean starch, and it is not acceptable.

Figure 7:
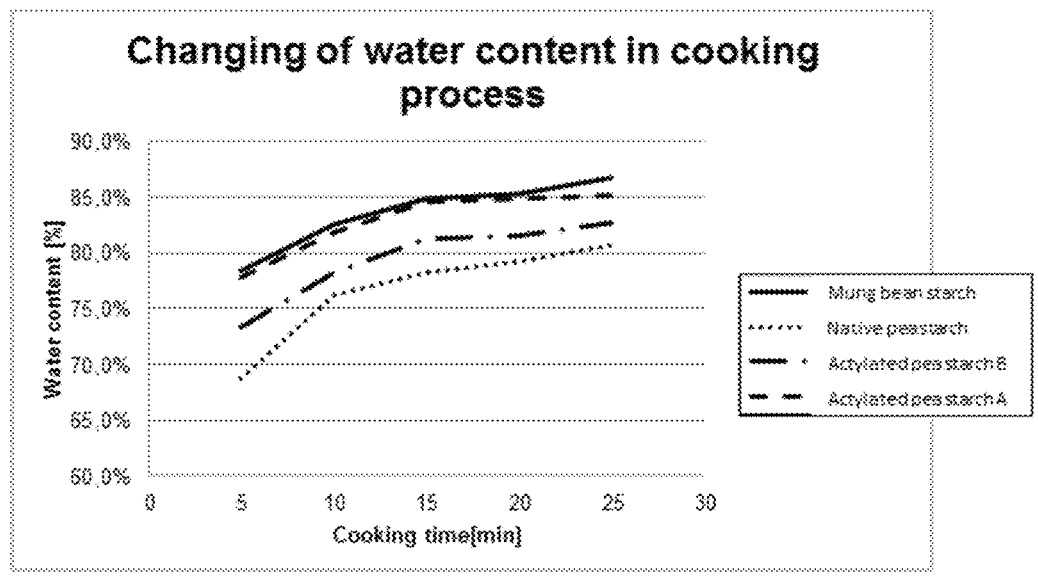
FIG. 7 shows the changing of water content in cooking process.

Water Content (Cf. FIG. 7)

The water uptake property of each starch in cooking process was compared.

This result indicates that the water uptake property of Mung bean starch and Acetylated pea starch "A" are almost the same, while Acetylated pea starch "B" is less efficient. However the water content trend of Acetylated pea starch "B" is still closer to the one of Mung bean starch than to the one of Native pea starch. Therefore it can be concluded that Acetylated pea starch "B" is acceptable compared to Native pea starch.

Conclusion

If Acetylated pea starch "C" is not acceptable for this application, Acetylated pea starch "A" and "B" can be retained.

Acetylated pea starch "A" is the best candidate, as it shows almost the same texture than the one of mung bean starch.

The invention claimed is:

1. A glass noodle, containing more than 99% of low acetylated pea starch and water, wherein the low acetylated pea starch has an acetyl value of between 0.25 and 1%.

2. The noodle of claim 1, characterized in that the acetyl value of the low acetylated pea starch is between 0.55 and 1%.

3. The noodle of claim 1, characterized in that the low acetylated pea starch shows a gelatinized temperature decreased from 0.4 to 5.0° C. compared to the gelatinized temperature of the native pea starch.

4. The noodle of claim 1, characterized in that the low acetylated pea starch shows a gelatinized temperature decreased from 4.0 to 5.0° C. compared to the gelatinized temperature of the native pea starch.

5. The noodle of claim 2, characterized in that the low acetylated pea starch shows a gelatinized temperature decreased from 0.4 to 5.0° C. compared to the gelatinized temperature of the native pea starch.

6. The noodle of claim 2, characterized in that the low acetylated pea starch shows a gelatinized temperature decreased from 4.0 to 5.0° C. compared to the gelatinized temperature of the native pea starch.

7. The noodle of claim 3, characterized in that the low acetylated pea starch shows a gelatinized temperature decreased from 4.0 to 5.0° C. compared to the gelatinized temperature of the native pea starch.

8. The noodle of claim 1, characterized in that the noodle does not show white color after cooking.

9. The noodle of claim 1, characterized in that the noodle is transparent after cooking.

10. The noodle of claim 1, characterized in that the noodle is comparable to a glass noodle consisting essentially of mung bean starch and water in terms of water uptake property during cooking.

11. The noodle of claim 1, characterized in that the noodle is comparable to a glass noodle consisting essentially of mung bean starch and water, with a similar appearance and texture after cooking.

* * * * *